E. O. GRAY & N. E. PARKS.
SPRING TRACTION WHEEL.
APPLICATION FILED APR. 16, 1918.

1,295,733.

Patented Feb. 25, 1919.
2 SHEETS—SHEET 1.

Witnesses

Inventor
E. O. Gray.
N. E. Parks.

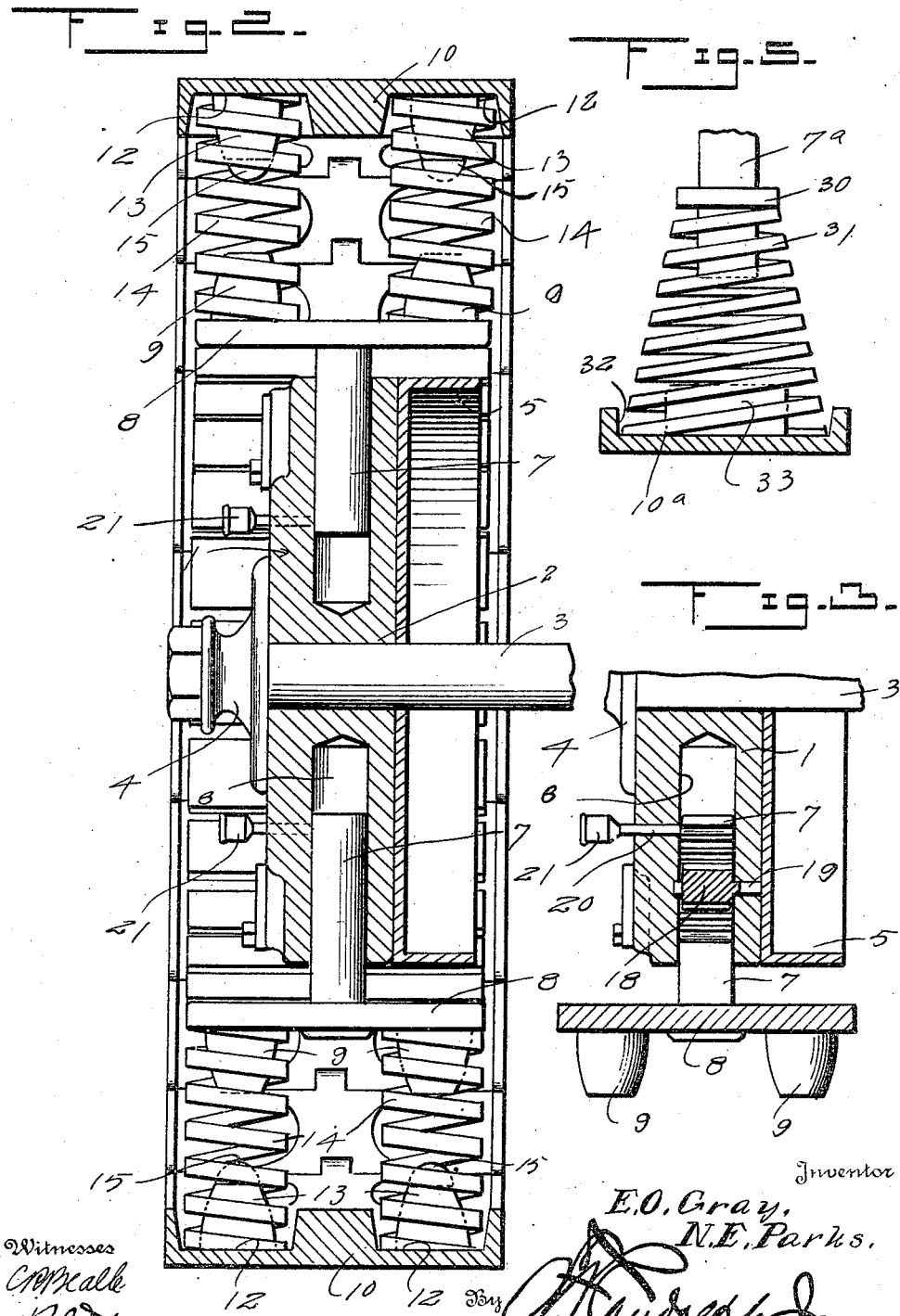

UNITED STATES PATENT OFFICE.

ELMER O. GRAY AND NORMAN E. PARKS, OF COLEBROOK, NEW HAMPSHIRE.

SPRING TRACTION-WHEEL.

1,295,733.	Specification of Letters Patent.	Patented Feb. 25, 1919.

Application filed April 16, 1918. Serial No. 228,953.

*To all whom it may concern:*

Be it known that we, ELMER O. GRAY and NORMAN E. PARKS, citizens of United States, residing at Colebrook, in the county of Coos and State of New Hampshire, have invented certain new and useful Improvements in Spring Traction-Wheels; and we do hereby declare the following to be a full, clear, and exact description of the invention, such as will enable others skilled in the art to which it appertains to make and use the same.

This invention relates to spring wheels, particularly designed for use upon tractors, or analogous motor vehicles and the primary object of the invention is to provide a spring or resilient wheel structure which is made up so as to eliminate the necessity of the employment of rubber or cushioned tires and to eliminate the inconveniences contingent with such tires.

More specifically, the object of this invention is to provide a spring traction wheel structure the rim of which is composed of a plurality of pivotally connected sections, against the inner surface of each of which sections an expanding coiled spring abuts, which spring also engages a head formed upon a sliding spoke structure, to cause shocks occasioned by the travel of the wheel over rough places to be absorbed by the springs.

A further object of this invention is to provide means connecting each pair of adjacent spokes so that when one of the spokes is moved inwardly, the adjacent spoke will be moved outwardly, thereby equalizing the strain.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views and in which:

Fig. 2 is a vertical section through the wheel.

Fig. 3 is a fragmentary section through the wheel taken at a different point than the section illustrated in Fig. 2 and taken on the line 3—3 of Fig. 1.

Fig. 5 is a fragmentary view of a modified form of the invention.

Figure 1:
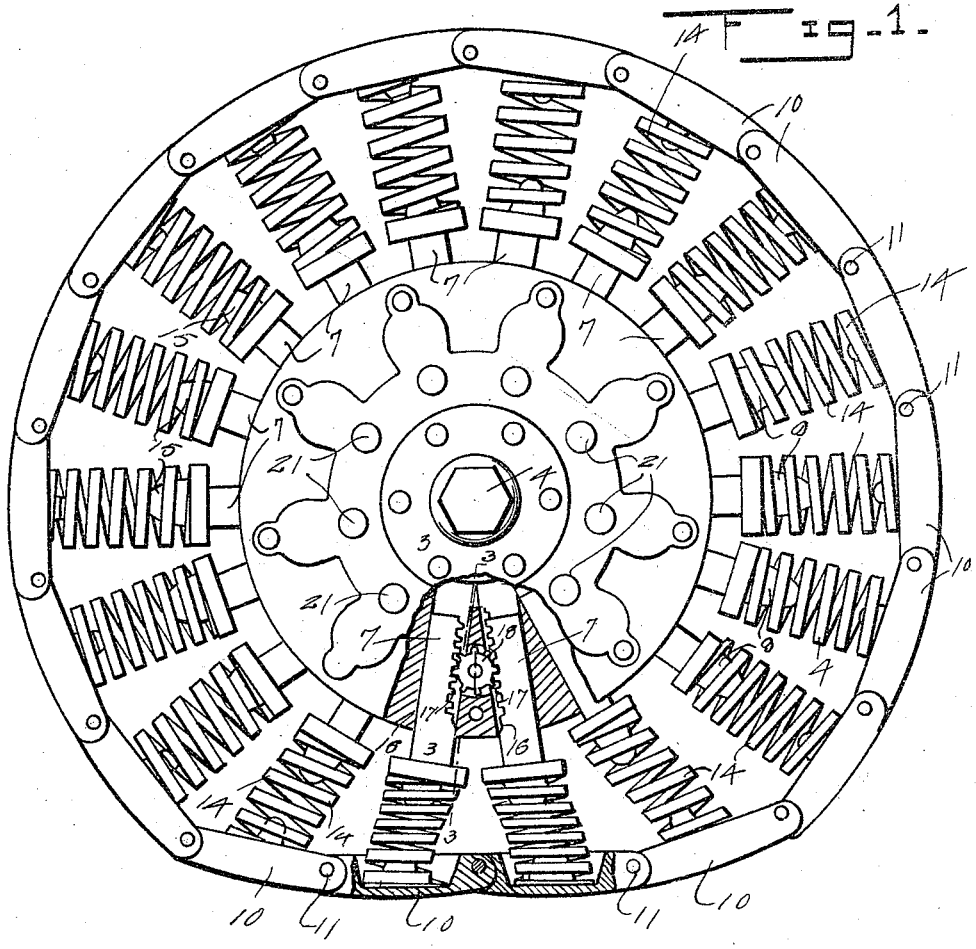
Figure 1 is a side elevation of the improved wheel having parts thereof in section.
Figure 4:
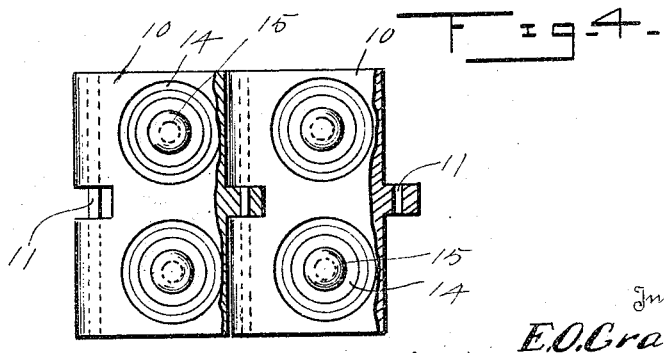
Fig. 4 is a fragmentary view of the wheel structure showing the inner surfaces of two of the tread plates and the spring retaining members carried thereby.

Referring more particularly to the drawings, 1 designates the hub structure of the wheel which is formed of a single member, provided with a central bore 2 to receive the axle spindle 3. The usual or ordinary type of nut structure 4 may be employed for retaining the wheel upon the axle spindle. A break drum 5 is also attached to the inner surface of the hub member 1 of the wheel.

The hub member 1 of the wheel is provided with a plurality of radiating bores or recesses 6 into which the spoke structure 7 slidably extends. The spokes 7 are substantially T-shaped having transversely extending heads 8 formed upon their outer ends. A pair of spring retaining projections 9 are formed upon each head 8 of each of the spoke structures and these projections are spaced near the ends of their heads as clearly shown in the drawings.

The rim of the wheel is composed of a plurality of sections 10, which are pivotally connected as shown at 11, to permit independent movement of the various sections during the rotation of the wheel. The sections 10 are provided with recesses 12 formed in their inner surfaces, and spring retaining lugs 13 extend inwardly from the inner surfaces of the recesses, centrally thereof and in alinement with the lugs 9, when in their normal positions. Spiral springs 14 are positioned between the heads 8 of the spoke structures and the plates 10, having their inner ends coiled about the lugs 9 and their outer ends coiled about the lugs 13, as clearly shown in the drawings. The outer ends of the springs extend into the recesses 12 the walls of which recesses in connection with the lugs 13 prevent accidental disconnection or displacement of any of the springs. Cushioning blocks or plugs 15 are attached to the inner ends of the lugs 13 and they are provided to prevent mutilation of the lugs 9 and 13 should these lugs come in contact with each other during the operation of the wheel.

The shanks of the spoke structure 7 which are slidably seated in the bores 6, are provided with cutaway portions as indicated at 16 and the faces of these cutaway portions have rack teeth 17 formed thereon. The rack teeth 17 of each adjacent pair of spokes 7 mesh with a pinion 18. The pinions 18 have stub shafts 19 carried thereby which are journaled in the hub casting 1 for rotatably supporting the pinions. The pinions 18 meshing with the rack teeth 17 will, when one of the spoke structures is forced inwardly by the striking of the section of the wheel to which it is connected, against an obstruction, force the adjacent spoke structure outwardly.

The hub structure 1 is provided with a plurality of oil or lubricating ducts 20 in communication with grease or lubricant-retaining cups 21, so as to permit the lubrication of the bearing surfaces of the bores 6, and the spokes 7.

In Fig. 5 of the drawing a modified form of the invention is shown. In the modified form, the spokes 7ª have collars 30 mounted thereon, either swaged upon the spokes or otherwise suitably attached to the spokes to prevent movement thereof. A helical coil spring 31 is coiled about the outer end of each spoke, having its inner end engaging the collar 30 and its outer enlarged or base end seated in a recess 32 formed in the tread plate 10ª. The tread plate 10ª has a lug 33 formed upon the inner surface thereof which projects inwardly centrally within the recess 32 and engages in the outer enlarged end of the helical spring 31 for preventing, in connection with the side walls of the recess, the accidental displacement of the helical spring. In the modified form, the tread plates 10ª are connected in identical the same manner as the tread plates 10 are connected in the preferred form.

From Fig. 1 of the drawings, it will be noticed, that during the operation of the improved resilient wheel, the tread plates 10 will owing to their pivotal connection flatten out at the ground engaging portion, providing a greater traction surface for the wheel and consequently increasing the power of the vehicle upon which the wheels are mounted.

From the foregoing description taken in connection with the accompanying drawings the advantages of construction and the method of operation of the improved spring traction wheel will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a spring traction wheel, the combination, of a rim structure composed of a plurality of pivotally connected sections, a hub structure, a plurality of spokes slidably carried by said hub structure, springs arranged between the pivoted sections of said rim and said spokes, and means connecting the spokes in pairs whereby when one of the spokes is forced inwardly the other spoke will be forced outwardly a corresponding distance.

2. In a spring traction wheel, the combination, of a hub structure, a plurality of spokes slidably carried by said hub structure, a rim structure, springs extending between and engaging said spokes and said rim structure, and means connecting the spokes in pairs whereby when one of said spokes is forced inwardly the adjacent spoke in the pair will be forced outwardly a corresponding distance.

3. In a spring traction wheel, a hub structure, a plurality of spokes slidably carried by said hub structure, each of said spokes comprising a shank and a head formed upon the outer end of said shank and extending transversely thereto, a rim composed of a plurality of pivotally connected sections, and springs engaging the inner surfaces of the sections of said rim and the outer surfaces of the transversely extending heads of said spokes, and means to prevent accidental displacement of said springs.

4. In a spring traction wheel, the combination, of a hub structure, a plurality of T-headed spokes slidably carried by said hub structure, a rim structure, a plurality of spiral springs extending between the heads of said spokes and the rim structure, and means for preventing accidental displacement of said springs.

5. In a spring traction wheel, the combination, of a hub structure, a plurality of T-headed spokes slidably carried by said hub structure, a rim, spiral springs extending between the heads of said T-headed spokes and said rim, and means connecting the spokes in pairs whereby when one of said spokes of a pair is forced inwardly, the other spoke of the pair will be forced outwardly a corresponding distance.

6. In a spring traction wheel, the combination, of a hub structure, a rim composed of a plurality of pivotally connected sections, T-headed spokes slidably carried by said hub structure, and having their heads positioned outwardly, said rim sections provided with recesses in their inner faces, springs having their outer ends seated in said recesses and their inner ends engaging the heads of said spokes, and means to prevent accidental displacement of said springs.

7. In a spring traction wheel, the combination, of a hub structure, a rim composed of a plurality of pivotally connected sections, T-headed spokes slidably carried by said hub structure, and having their heads positioned outwardly, said rim sections provided with recesses in their inner faces, springs having their outer ends seated in said recesses and their inner ends engaging the heads of said spokes, and means to prevent accidental displacement of said springs, and means connecting the spokes in pairs whereby when one of the spokes of a pair is forced inwardly, the other spoke of the pair will be forced outwardly a corresponding distance.

8. In a spring traction wheel, a hub structure, a plurality of T-headed spokes slidably carried by said hub structure and provided with cutaway portions extending longitudinally thereof, rack teeth formed on said cutaway portions, pinions carried by said hub structure and meshing with said rack teeth, a rim structure, and yieldable means connecting said spokes and said rim structure.

9. In a spring traction wheel, a hub structure, a plurality of T-headed spokes carried by said hub structure and having their heads positioned outwardly, rack teeth formed upon said spokes, pinions carried by said hub structure and connecting the spokes in pairs, a rim structure composed of a plurality of pivotally connected sections, spiral springs extending between said sections and the heads of said T-headed spokes, and means for preventing accidental displacement of said springs.

In testimony whereof we affix our signatures in presence of two witnesses.

ELMER O. GRAY.
NORMAN E. PARKS.

Witnesses:
M. A. HOOKER,
E. C. NORRIS.